United States Patent
Graham et al.

(10) Patent No.: US 11,624,588 B2
(45) Date of Patent: Apr. 11, 2023

(54) CODED APERTURE SEEKER FOR NAVIGATION

(71) Applicant: Simmonds Precision Products, Inc., Vergennes, VT (US)

(72) Inventors: Jason Graham, Prior Lake, MN (US); Gary Willenbring, Waconia, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 209 days.

(21) Appl. No.: 17/111,892

(22) Filed: Dec. 4, 2020

(65) Prior Publication Data

US 2021/0404769 A1    Dec. 30, 2021

Related U.S. Application Data

(60) Provisional application No. 63/043,990, filed on Jun. 25, 2020.

(51) Int. Cl.
*F41G 7/34* (2006.01)
*G06V 20/13* (2022.01)
*F41G 7/22* (2006.01)

(52) U.S. Cl.
CPC ............ *F41G 7/343* (2013.01); *F41G 7/222* (2013.01); *F41G 7/2213* (2013.01); *F41G 7/2246* (2013.01); *F41G 7/346* (2013.01); *G06V 20/13* (2022.01)

(58) Field of Classification Search
CPC ........ F41G 7/343; F41G 7/2213; F41G 7/222; F41G 7/2246; F41G 7/346; G06V 20/13
See application file for complete search history.

(56) References Cited

U.S. PATENT DOCUMENTS

| 7,888,626 | B2 | 2/2011 | Slinger et al. |
| 8,243,353 | B1 | 8/2012 | Gutin et al. |
| 9,445,115 | B2 | 9/2016 | DeWeert et al. |
| 9,743,024 | B2 | 8/2017 | Tyrrell et al. |
| 10,297,697 | B1 | 5/2019 | Wahl |
| 2015/0323287 | A1* | 11/2015 | Durand ................ F41G 7/2286 244/3.19 |
| 2016/0084623 | A1* | 3/2016 | Facciano ................ H01Q 1/42 342/372 |
| 2018/0245882 | A1 | 8/2018 | Avni |

(Continued)

FOREIGN PATENT DOCUMENTS

EP    3842841 A1    6/2021

OTHER PUBLICATIONS

Chen Fu et al., "Comnpressive Spectral Imaging via Polar Coded Aperture", IEEE Transactions on Computational Imaging, vol. 3, No. #, pp. 408-420.

(Continued)

*Primary Examiner* — Marcus E Windrich
(74) *Attorney, Agent, or Firm* — Locke Lord LLP; Joshua L. Jones; Scott D. Wofsy

(57) ABSTRACT

A guided munition system includes a munition body including at least one fluid dynamic control for changing course of the munition body in flight. A seeker onboard the munition body is operatively connected to control the at least one fluid dynamic control. The seeker includes a coded aperture imaging device facing outward from the munition body for image based control for guiding the munition body in flight.

16 Claims, 2 Drawing Sheets

(56) References Cited

U.S. PATENT DOCUMENTS

2019/0063875 A1\* 2/2019 Ell ........................ F41G 7/2246
2019/0242711 A1\* 8/2019 Ingersoll ................ G01C 11/02
2020/0049550 A1\* 2/2020 Graham ................ G01J 1/0437

OTHER PUBLICATIONS

Extended European Search Report dated Nov. 24, 2021, issued during the prosecution of European Patent Application No. EP21181572.5, 7 pages.

\* cited by examiner

CODED APERTURE SEEKER FOR NAVIGATION

CROSS REFERENCE TO RELATED APPLICATION

This application claims the benefit of priority to U.S. Provisional Patent Application Ser. No. 63/043,990, filed on Jun. 25, 2020, the disclosure of which is incorporated herein by reference in its entirety.

BACKGROUND

1. Field

The present disclosure relates to imaging, and more particularly to imaging systems such as used in guidance systems.

2. Description of Related Art

There is an ever increasing need for navigational accuracy, correction of navigational inertial measurements drift, and navigation through global positioning system (GPS) denied environment, such as in guided munitions. There is also ongoing design pressure to decrease package size and increase capabilities. This disclosure provides solutions for these needs.

SUMMARY

A guided munition system includes a munition body including at least one fluid dynamic control for changing course of the munition body in flight. A seeker onboard the munition body is operatively connected to control the at least one fluid dynamic control. The seeker includes a coded aperture imaging device facing outward from the munition body for image based control for guiding the munition body in flight.

The coded aperture imaging device can be mounted on an outer skin of the munition body. The coded aperture imaging device can face forward on the munition body relative to a longitudinal axis of the munition body. The coded aperture imaging device can be a laterally facing coded aperture imaging device, which faces laterally relative to a longitudinal axis of the munition body, wherein the laterally facing coded aperture imaging device is configured to provide images to the seeker for navigation as the munition body spins about the longitudinal axis. It is also contemplated that at least one additional laterally facing coded aperture imaging device can be operatively connected to the seeker, wherein the first laterally facing coded aperture imaging device and the at least one additional laterally facing coded aperture imaging device are configured to provide images to the seeker for navigation as the munition body is spin stabilized about the longitudinal axis.

The seeker can be configured to utilize images obtained of celestial bodies, horizon, and surface terrain from the at least one laterally facing coded aperture imaging device and/or the forward facing coded aperture imaging device. The coded aperture imaging device can include a sensor spaced apart from a coded aperture. The sensor can include a focal plane array (FPA). The FPA can be sensitive to short-wave infrared (SWIR) wavelengths. The coded aperture can include a pattern of transparent and opaque or reflective areas defined in a mask on the substrate. The coded aperture can include a spatial light modulator (SLM) configured to change the pattern in the mask for situational adaptability. The coded aperture can include a static coded pattern attached to actuators configured to move the static coded pattern relative to the sensor.

A method of guiding a munition includes guiding a munition to a target using images obtained with a coded aperture imaging device onboard the guided munition. Using images obtained with a coded aperture imaging device can include collecting images while the coded aperture imaging device is directed to the sky and, digitally processing the images to locate celestial bodies within the images. Using images obtained with a coded aperture imaging device can include collecting images of the ground and comparing the images to topology maps of a terrain path. Guiding the munition can include finding direction and orientation of the munition by analyzing lines of data within an image from the coded aperture imaging device that includes the horizon. Guiding the munition can include using direction intensity data of the atmosphere with sky in view in an image from the coded aperture imaging device. The method can include upfinding for the munition, determining pitch of the munition, and determining roll of the munition using an image from the coded aperture imaging device. The method can include determining yaw of the munition through determining rotational orientation of celestial bodies in a celestial view in an image from the coded aperture imaging device.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
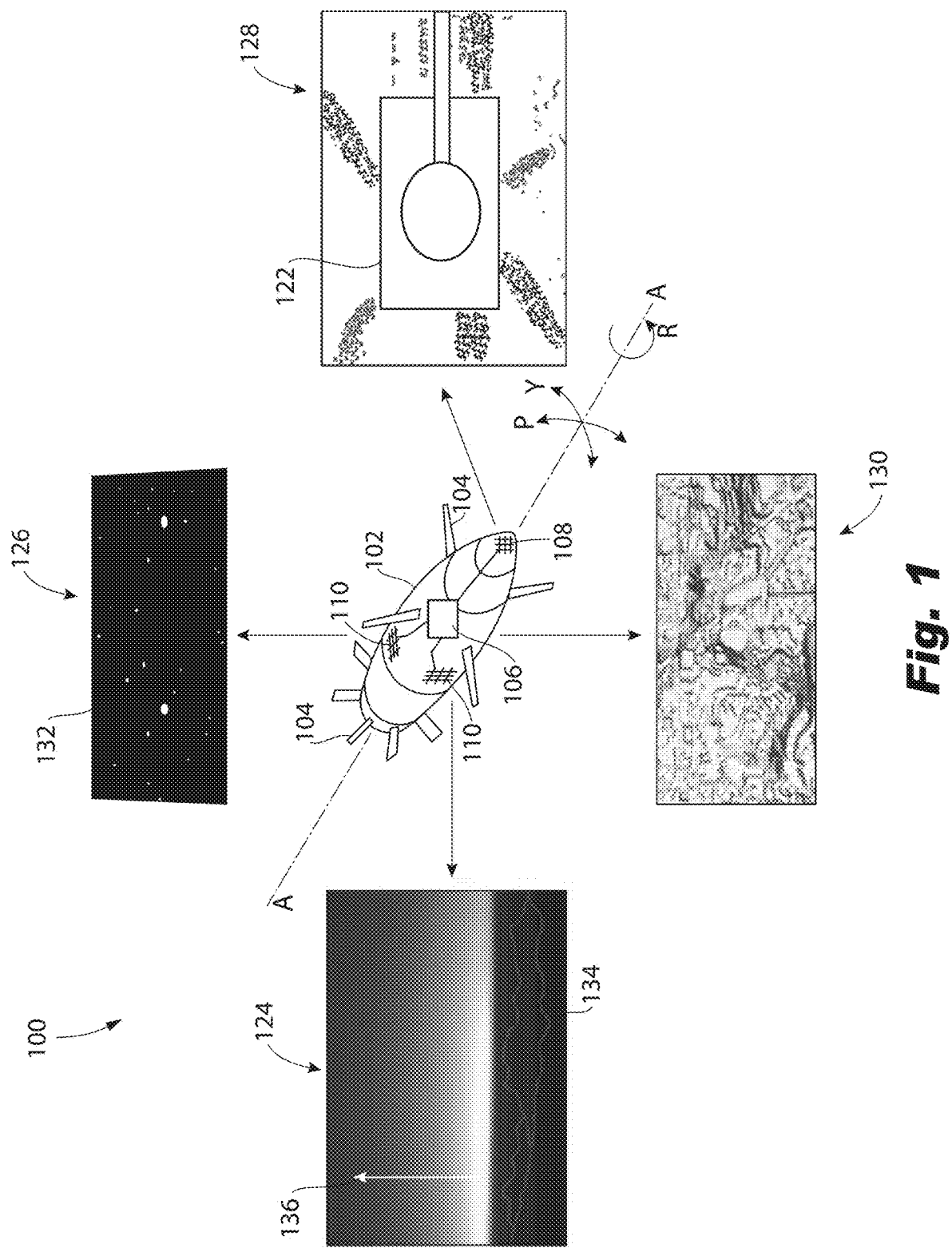
FIG. 1 is a schematic perspective view of an embodiment of a system constructed in accordance with the present disclosure, showing a munition body with a plurality of coded aperture imaging devices thereon.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to navigate such as in guided munitions.

The guided munition system 100 includes a munition body 102 including at least one fluid dynamic control, e.g. control surfaces, thrust vectoring nozzle, fins 104, and/or the like, for changing course of the munition body 102 in flight. A seeker 106 onboard the munition body 102 is operatively connected to control the at least one fluid dynamic control. The seeker 106 includes the coded aperture imaging devices 108, 110, which face outward from the munition body 102 for image based control for guiding the munition body 102 in flight.

Figure 2:
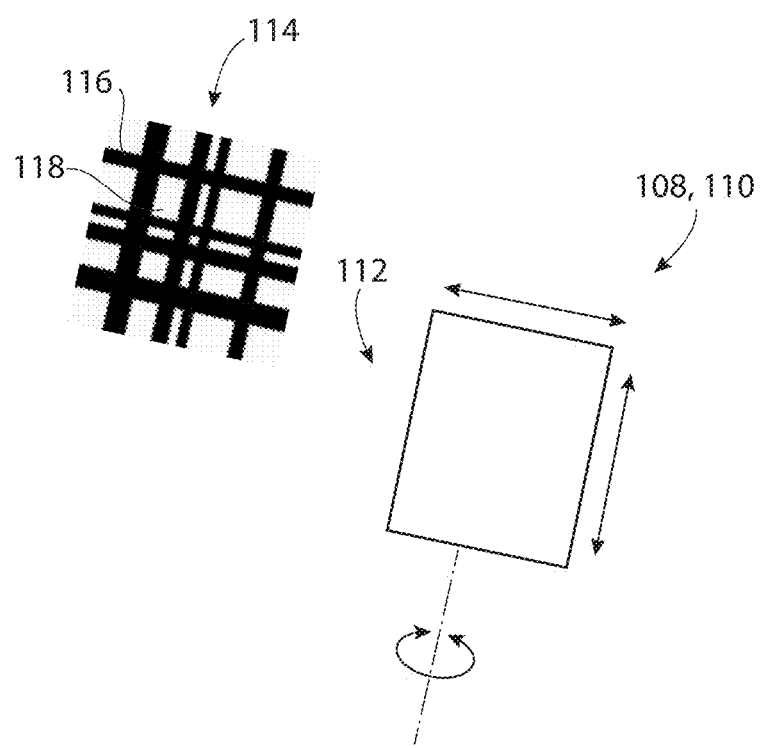
FIG. 2 is a schematic perspective view of a coded aperture imaging device as in FIG. 1, showing the coded aperture and the sensor.

The coded aperture imaging devices 108, 110 are mounted on an outer skin of the munition body 102, as shown in FIG. 1. The coded aperture imaging device 108 faces forward on the munition body 102 relative to a longitudinal axis A of the munition body 102. At least one laterally facing coded aperture imaging device 110 is operatively connected to the seeker 106. The at least one laterally facing coded aperture imaging device 110 faces laterally outward relative to the longitudinal axis A and is configured to provide images to the seeker 106 for navigation as the munition body spins about the longitudinal axis A. Two laterally facing coded aperture imaging devices 110 are shown in FIG. 2, however those skilled in the art will readily appreciate that any suitable number of laterally facing coded aperture imaging devices 110 can be used without departing from the scope of this disclosure. The seeker 106 is configured to utilize images obtained of celestial bodies, horizon, and surface terrain from the coded aperture imaging devices 108, 110.

Each of the coded aperture imaging devices 108, 110 includes a sensor 112 spaced apart from a coded aperture 114. The sensor 112 can include a focal plane array (FPA) of pixels, and can be sensitive to short-wave infrared (SWIR) wavelengths, or any other suitable wavelengths. The coded aperture 114 includes a pattern of transparent areas 118 and opaque or reflective areas 116 defined, e.g. in a mask on a substrate. The coded aperture 114 can include includes a spatial light modulator (SLM) configured to change the pattern 116, 118 in the mask for situational adaptability. It is also contemplated that the coded aperture 114 can include a static coded pattern 116, 118 attached to actuators 120 configured to move the static coded pattern 116, 118 relative to the sensor 112, as indicated by the double arrows in FIG. 2.

With reference again to FIG. 1, a method of guiding a munition includes guiding a munition, e.g. munition body 102, to a target, e.g. the tank 122 in FIG. 1, using images, e.g. images 124, 126, 128, 130, obtained with a coded aperture imaging device, e.g. devices 108, 110, onboard the guided munition. This can include collecting images while the coded aperture imaging device is directed to the sky, as in images 124, 126, and digitally processing the images to locate celestial bodies such as stars 132 within the images. This can also include collecting images of the ground, as in images 124, 128, 130, and comparing the images to topology maps of a terrain path, e.g. maps stored in the seeker 106. Guiding the munition can include finding direction and orientation of the munition by analyzing lines of data within an image from the coded aperture imaging device that includes the horizon 134, as in image 124. Guiding the munition can include using direction intensity data of the atmosphere, e.g. the value gradient indicated by arrow 136 in image 124, with sky in view in an image from the coded aperture imaging devices. The axial or forward facing coded aperture imaging device 108 can capture the same type of information as the laterally facing coded aperture imaging devices 110 and can combine that data with data captured by the laterally facing coded aperture imaging devices 110.

The method can include upfinding for the munition, determining pitch P of the munition, and determining roll R of the munition using one or more images from the coded aperture imaging devices. This can include determining yaw Y of the munition through determining rotational orientation of celestial bodies (e.g. stars 132) in a celestial view in an image (e.g. image 126) from the coded aperture imaging devices. These navigational methods can for example be utilized for inertial navigation correction and in GPS denied environments.

In traditional lensed optics, the field of view is limited by the individual lens physical diameters, minimizing how much of the scene can be observed. In coded aperture imaging, the field of view is limited by the sensor pixel's chief ray angle, which can allow maximizing the view of the scene from the sensor relative to traditional lens imaging.

A single imaging system 110 can be utilized facing radially on a spinning platform/airframe and can be trained to analyze for different visual navigation scenes depending on its particular rotational orientation at any given moment. It is also contemplated that imaging systems 108, 110 can be used on a spin stable platform. A potential benefit of using a spinning platform with a radially facing imaging system 110 can allow use of fewer devices, e.g. for switching between "navigation modes" on the device 110, e.g. celestial, terrestrial, horizon, and the like. A spin stabilized munition could utilize multiple imaging systems 108, 110 to gather various different types of data, e.g. celestial, terrestrial, horizon, and the like.

A potential benefit of the small form factor of coded aperture imaging devices 108, 110 is that multiple imaging sensors can be utilized on a single munition, strategically located on the platform/airframe such that multiple field of views can be overlapped and combined into a larger field of view or one continuous view. It can also be envisioned that multiple sensors can be coupled in a grid to create a larger format image. Navigational data can be shared between multiple sensors and sensor orientations. It is contemplated that each imaging sensor 112 can have its own digital processor, or each imaging sensor 112 can be tied to a single digital processor, or either can be connected to a series of digital processors. The processor or processors can be used to deconvolve the data from the sensor 112 to form useful images, such as images 124, 126, 128, 130. Radially aimed imaging systems, e.g. devices 110, can be used in conjunction with axially aimed imaging systems, e.g. device 108, where the former aids in trajectory navigation and navigational correction, and the latter aids in target recognition, acquisition and tracking, as well as distance to target.

The use of a spatial light modulator to create the coded aperture has many potential benefits, as it can be programmed to change the coded aperture pattern dependent on the current situation. An SLM could change the pattern based on optimizing for imaging sky or terrain, whichever it is currently in view, for example. This pattern can continually change for a spinning guided munition, whereas on a spin stable platform the pattern can be optimized for the imaging system's current view. Upon input from the imaging sensor or digital processing, the SLM can be programmed to block out visual countermeasures within a scene, prevent image saturation or prevent sensor optical parameters from changing, by means of dynamically changing the coded aperture pattern to adjust for these issues. The amount of blur introduced into an image from the coded aperture can be controlled through the pattern selection and removed if multiple images are collected and combined. The coded aperture through use of an SLM can be programmed to optimize the pattern for the amount of desired light transmission to the sensor.

The use of a spatial light modulator or attaching actuators, e.g. piezo, to a static coded aperture mask, can be utilized for optical dithering. These means can be applied to remove imaging errors caused by hot or cold pixels and/or to remove background noise. This can be done by moving the pattern a known distance, deconvolving multiple images and combining.

SWIR (short-wave infrared) light is reflective in nature and is capable of being utilized for imagery. It is covert in nature when utilizing an illuminator. It also can be utilized in environments such as night or low light because of the sensor sensitivity, and obscured views of terrain and sky because of the light bandwidth's ability to penetrate certain obscurants.

Celestial navigation through this imaging system can be done by collecting images while the sensor is pointed at the sky. These images can then be digitally processed to locate stars within the image, match them to a database of known star positions and information about date, time of day and launch location, and algorithms run to determine current global position based on recognized stars in the image.

Visual Ground navigation through this imaging system can be done by collecting images of the ground from overhead, e.g. images 124, 128, 130, and comparing to topology maps of a terrain path, that are preloaded into the system prior to flight. Terrain data may need scaling dependent on altitude.

Traditional optics that utilize lenses inherently introduce image distortion to some extent due to the physical nature that the lenses are bending the light in order to focus on the sensor. Because the coded aperture is fundamentally a different imaging method, this cause of image distortion can be removed. This can potentially be an essential method for removing measurement errors during the star matching process in celestial navigation. Systems and methods as disclosed herein can utilize directionally aimed imaging systems with coded apertures and sensors, multiple coded aperture and sensor pairs, and specific use cases to provide improved navigational accuracy. The thin design using coded apertures allows for imaging systems to be placed in previously unavailable spaces on or in a munition. With those new locations and multiple views, a larger navigational dataset can be obtained optically through celestial and terrain views.

The methods and systems of the present disclosure, as described above and shown in the drawings, provide for navigation such as in guided munitions. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A guided munition system comprising:
   a munition body including at least one fluid dynamic control for changing course of the munition body in flight; and
   a seeker onboard the munition body operatively connected to control the at least one fluid dynamic control, wherein the seeker includes a coded aperture imaging device facing outward from the munition body for image based control for guiding the munition body in flight,
   wherein the coded aperture imaging device includes a sensor spaced apart from a coded aperture,
   wherein the sensor includes a focal plane array (FPA), wherein the FPA is sensitive to short-wave infrared (SWIR) wavelengths,
   wherein the coded aperture includes a pattern of transparent and opaque or reflective areas defined in a mask on the substrate, and
   wherein the coded aperture includes a spatial light modulator (SLM) configured to change the pattern in the mask for situational adaptability.

2. The system as recited in claim 1, wherein the coded aperture imaging device faces forward on the munition body relative to a longitudinal axis of the munition body.

3. The system as recited in claim 1, wherein the coded aperture imaging device faces laterally relative to a longitudinal axis of the munition body.

4. The system as recited in claim 1, wherein the coded aperture imaging device is a laterally facing coded aperture imaging device, which faces laterally relative to a longitudinal axis of the munition body, wherein the laterally facing coded aperture imaging device is configured to provide images to the seeker for navigation as the munition body spins about the longitudinal axis.

5. The system as recited in claim 1, wherein the coded aperture imaging device is a first laterally facing coded aperture imaging device, which faces laterally relative to a longitudinal axis of the munition body, and further comprising:
   at least one additional laterally facing coded aperture imaging device operatively connected to the seeker, wherein the first laterally facing coded aperture imaging device and the at least one additional laterally facing coded aperture imaging device are configured to provide images to the seeker for navigation as the munition body is spin stabilized about the longitudinal axis.

6. The system as recited in claim 5, wherein the seeker is configured to utilize images obtained of celestial bodies, horizon, and surface terrain from the at least one laterally facing coded aperture imaging device.

7. A guided munition system comprising:
   a munition body including at least one fluid dynamic control for changing course of the munition body in flight; and
   a seeker onboard the munition body operatively connected to control the at least one fluid dynamic control, wherein the seeker includes a coded aperture imaging device facing outward from the munition body for image based control for guiding the munition body in flight,
   wherein the coded aperture imaging device includes a sensor spaced apart from a coded aperture,
   wherein the sensor includes a focal plane array (FPA), wherein the FPA is sensitive to short-wave infrared (SWIR) wavelengths,
   wherein the coded aperture includes a pattern of transparent and opaque or reflective areas defined in a mask on the substrate, and wherein the coded aperture includes a static coded pattern attached to actuators configured to move the static coded pattern relative to the sensor.

8. The system as recited in claim 1, wherein the coded aperture imaging device is mounted on an outer skin of the munition body.

9. A method of guiding a munition comprising:
   guiding a munition to a target using images obtained with a coded aperture imaging device onboard the guided munition wherein the coded aperture imaging device includes a spatial light modulator (SLM) configured to change the pattern in a mask for situational adaptability.

10. The method as recited in claim 9, wherein using images obtained with a coded aperture imaging device includes collecting images while the coded aperture imaging device is directed to the sky and, digitally processing the images to locate celestial bodies within the images.

11. The method as recited in claim 9, wherein using images obtained with a coded aperture imaging device includes collecting images of the ground and comparing the images to topology maps of a terrain path.

12. The method as recited in claim 9, wherein guiding the munition includes finding direction and orientation of the munition by analyzing lines of data within an image from the coded aperture imaging device that includes the horizon.

13. The method as recited in claim 9, wherein guiding the munition includes using direction intensity data of the atmosphere with sky in view in an image from the coded aperture imaging device.

14. The method as recited in claim 9, further comprising upfinding for the munition, determining pitch of the munition, and determining roll of the munition using an image from the coded aperture imaging device.

15. The method as recited in claim 9, further comprising determining yaw of the munition through determining rotational orientation of celestial bodies in a celestial view in an image from the coded aperture imaging device.

16. A method of guiding a munition comprising:
guiding a munition to a target using images obtained with a coded aperture imaging device onboard the guided munition, wherein the coded aperture imaging device includes a static coded pattern attached to actuators configured to move the static coded pattern relative to a sensor.

* * * * *